(12) United States Patent
Muenzenberger

(10) Patent No.: US 9,580,921 B2
(45) Date of Patent: Feb. 28, 2017

(54) LINE CONDUIT

(71) Applicant: Hilti Aktiengesellschaft, Schaan (LI)

(72) Inventor: Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 35 days.

(21) Appl. No.: 14/417,100

(22) PCT Filed: Jul. 23, 2013

(86) PCT No.: PCT/EP2013/065479
§ 371 (c)(1),
(2) Date: Jan. 23, 2015

(87) PCT Pub. No.: WO2014/016278
PCT Pub. Date: Jan. 30, 2014

(65) Prior Publication Data
US 2015/0204087 A1 Jul. 23, 2015

(30) Foreign Application Priority Data
Jul. 26, 2012 (DE) ........................ 10 2012 213 107

(51) Int. Cl.
*E04G 15/06* (2006.01)
*F16L 5/04* (2006.01)
(Continued)

(52) U.S. Cl.
CPC ............ *E04G 15/061* (2013.01); *E04B 1/947* (2013.01); *E04B 5/36* (2013.01); *F16L 5/04* (2013.01); *E04B 2103/02* (2013.01); *H02G 3/22* (2013.01)

(58) Field of Classification Search
CPC .. F16L 5/04; E04B 1/948; E04B 1/947; E04B 5/36; E04G 13/061
(Continued)

(56) References Cited

U.S. PATENT DOCUMENTS 4,748,787 A * 6/1988 Harbeke ...................... 52/741.3
4,888,925 A 12/1989 Harbeke
(Continued)

FOREIGN PATENT DOCUMENTS

DE          101 25 177        12/2002
DE     10 2004 048180          6/2005
(Continued)

OTHER PUBLICATIONS

Machine Translation of DE102011006201, May 27, 2015, ESPACENET.*

*Primary Examiner* — Joshua J Michener
*Assistant Examiner* — Alp Akbasli
(74) *Attorney, Agent, or Firm* — Davidson, Davidson & Kappel, LLC

(57) ABSTRACT

A line conduit (10) to be cast into a structural element (12), especially a floor/ceiling and/or wall made of concrete, including an elongated housing (18) that has a holding space (25) for at least one line (16). The space is continuous in the lengthwise direction (L), and includes a fire-protection element (26) made of an intumescent material that is arranged around the inner wall of the housing (18) in the circumferential direction, whereby at least one anchoring element (34) is provided on the inner wall of the housing (18), the element being anchored inside the fire-protection element (26).

17 Claims, 2 Drawing Sheets

(51) Int. Cl.
 *E04B 1/94* (2006.01)
 *E04B 5/36* (2006.01)
 *H02G 3/22* (2006.01)

(58) Field of Classification Search
 USPC .................. 52/232, 220.1, 220.7, 220.8, 1
 See application file for complete search history.

(56) References Cited

U.S. PATENT DOCUMENTS

| | | | |
|---|---|---|---|
| 6,305,133 B1* | 10/2001 | Cornwall | 52/232 |
| 6,643,985 B2 | 11/2003 | Muenzenberger | |
| 6,668,499 B2* | 12/2003 | Degelsegger | 52/204.62 |
| 6,698,146 B2* | 3/2004 | Morgan et al. | 52/232 |
| 8,024,900 B2* | 9/2011 | Cordts | 52/220.8 |
| 8,181,404 B2* | 5/2012 | Klein | 52/232 |
| 8,397,453 B2* | 3/2013 | Shaw | 52/232 |
| 2001/0018814 A1* | 9/2001 | Degelsegger | 52/232 |
| 2003/0167712 A1* | 9/2003 | Robertson | 52/232 |
| 2004/0016191 A1* | 1/2004 | Whitty | 52/232 |
| 2004/0149390 A1* | 8/2004 | Monden et al. | 156/391 |
| 2007/0204536 A1* | 9/2007 | Latanision | 52/220.1 |
| 2007/0283644 A1 | 12/2007 | Fischer et al. | |
| 2008/0172960 A1* | 7/2008 | Hilburn | 52/232 |
| 2009/0218130 A1 | 9/2009 | Monden et al. | |
| 2011/0247281 A1* | 10/2011 | Pilz et al. | 52/173.1 |
| 2011/0314757 A1* | 12/2011 | Pilz et al. | 52/232 |
| 2012/0117900 A1* | 5/2012 | Shaw | 52/232 |
| 2012/0280099 A1* | 11/2012 | Forg | A62C 2/065 |
| | | | 248/309.1 |
| 2012/0297709 A1* | 11/2012 | Hilburn | 52/232 |
| 2014/0020315 A1* | 1/2014 | Munzenberger | 52/232 |
| 2014/0260016 A1* | 9/2014 | Langille et al. | 52/232 |

FOREIGN PATENT DOCUMENTS

| | | | | |
|---|---|---|---|---|
| DE | 102008000420 | | 9/2009 | |
| DE | 102011006201 | * | 3/2011 | ............ A62C 2/065 |
| DE | 102010030836 | | 1/2012 | |
| EP | 1293714 | | 3/2003 | |
| EP | 1 512 434 | | 3/2005 | |
| FR | 2 370 139 | | 6/1978 | |
| GB | 1513543 | | 6/1978 | |
| WO | WO 89/04407 | | 5/1989 | |

* cited by examiner

LINE CONDUIT

The invention relates to a line conduit to be cast into a structural element, especially a floor/ceiling or wall made of concrete, comprising an elongated housing that has a holding space for at least one line, said space being continuous in the lengthwise direction, and comprising a fire-protection element made of an intumescent material that is arranged around the inner wall of the housing in the circumferential direction.

BACKGROUND

Line conduits are employed when structural elements are built using concrete or another liquid construction material so that openings in floors/ceilings or walls for lines such as, for instance, cables or pipes can be kept free in the structural elements or else can be integrated in them. The line conduits are positioned in a mold (formwork) into which the liquid construction material is filled, and they keep the desired opening in the structural element free while the construction material is being filled in.

The line conduits can also be removed once the construction material has hardened. However, they are often left in the wall and additional elements, for example, seals or fire-protection elements, are arranged in them so that the wall or floor/ceiling can be closed in case of a fire. The fire-protection element can be made of an intumescent material whose volume expands under exposure to heat, thus closing the wall opening.

The fire-protection element can be positioned in such a way that, once the wall or floor/ceiling is finished, it is situated on the surface of the structural element. As a result, the presence of heat will quickly heat up and activate the intumescent material.

This is particularly advantageous for a floor/ceiling opening. Plastic tubes that pass through such a floor/ceiling soften very quickly upon exposure to heat, forming a drop-shaped constriction below the insulating fire-protection element. The remaining, soft plastic tube is compressed and sealed off by the expanding fire-protection element. The tube that remains below the fire-protection element continues to melt or drops off due to gravity, while the fire-protection element, which continues to expand, is pressed into the section that remains in the line conduit.

This creates a stable bond between the remaining line section and the intumescent material. This entails the advantage that the fire-protection element is affixed and stabilized in the line conduit by the line section. Therefore, after the conduit has been heated up and sealed, there is sufficient stability to withstand, for example, a jet of water that is aimed directly at the fire-protection element.

In order to achieve a smooth wall finish, the fire-protection element is often arranged not on but rather in the opening in the wall or the floor/ceiling, so that the fire-protection element does not project beyond the surface of the structural element. This has the advantage that such a fire-protection element can be cast into the structural element while it is being made.

SUMMARY OF THE INVENTION

A drawback of this arrangement of the fire-protection element, however, is that the fire-protection element is only activated at a later point in time since the structural element keeps the heat away from the fire-protection element for a longer period of time. Consequently, the plastic tube is already completely melted in this area and the expanding intumescent material cannot bond to the plastic tube. As a result, the plastic tube can no longer support the expanded fire-protection element, so that the resistance of the intumescent material against a jet of water or other forces might be diminished. In order to provide greater stability, the fire-protection elements of such line conduits have to be dimensioned larger.

An object of the present invention is to provide a compact line conduit that has a fire-protection element having an intumescent material arranged in the housing and that provides sufficient stability of the fire-protection element in the line conduit, even after the intumescent material is in its expanded state.

The present invention provides a line conduit provided to be cast into a structural element, especially a floor/ceiling or wall made of concrete, comprising an elongated housing with a holding space for at least one line, said space being continuous in the lengthwise direction, and comprising a fire-protection element made of an intumescent material that is arranged around the inner wall of the housing in the circumferential direction. According to the invention, at least one anchoring element is provided on the inner wall of the housing, said element being anchored inside the fire-protection element. In case of a fire, the intumescent material forms a microporous and heat-insulating foam layer that, thanks to its low thermal conductivity and the exclusion of oxygen, protects the lines against the effects of the fire.

In the prior-art line conduits, the fire-protection element is merely placed on the inside of the elongated housing in order to allow said element to expand radially inwards without encountering any resistance, so that it can seal off the holding space. Even though the fire-protection element is often arranged in a groove in the elongated housing, it has no other permanent connection to the housing, so that, after the intumescent material has expanded, it can be pushed out of the line conduit without offering much resistance.

The anchoring element provided according to the invention ensures that, even after the intumescent material has expanded, a stable form-fitting connection exists between the housing and the fire-protection element in order to prevent the fire-protection element from being pushed out of the line conduit. The anchoring element securely holds the fire-protection element in the housing of the line conduit, even after the intumescent material has expanded, thereby ensuring that the wall or floor/ceiling opening is reliably closed, even in the case of exposure to substantial forces such as, for instance, the impact of a jet of water.

The anchoring element can be configured, for example, in such a way that it is surrounded on both sides by the intumescent material, as seen in the radial direction of the housing. As the intumescent material expands, the anchoring element is pressed by the fire-protection element—especially by the section of the fire-protection element that is radially on the outside—radially inwards into the conduit, as a result of which the holding function of the anchoring element can be enhanced.

The anchoring element is arranged, at least in certain sections, for example, in the lengthwise direction of the housing, so that it does not protrude inwards in the non-activated state of the intumescent material. When the intumescent material expands, the intumescent material that is between the wall opening and the anchoring element presses the anchoring element inwards into the holding space, so that the holding function can be enhanced. In particular, the anchoring element is arranged with one free end in the lengthwise direction of the housing, as a result of which the anchoring element can be simply bent radially inwards with this end.

The housing can have two sections with an essentially constant cross section, whereby the fire-protection element is arranged between these sections. The two sections define the diameter of the holding space and thus the cross section that is kept free for the lines. The fire-protection element is arranged between these, so that said element is in the center of the structural element and does not project to either side of the wall or floor/ceiling.

The anchoring element can project from the first or second section, for example, in the lengthwise direction, and can extend into the fire-protection element. In particular, the anchoring element can be part of this section. Thus, the axial end of the appertaining section can extend into the fire-protection element and can be, for example, slipped onto it, which translates into a simple construction of the line conduit. The line conduit can be configured, for instance, in modular form, so that an adaptation to the thickness of the wall or of the floor/ceiling or to the desired position of the fire-protection element is possible on site by changing the sections. The selected sections are plugged onto or inserted into the fire-protection element just before the wall or the floor/ceiling is built.

Preferably, a holding section in which the fire-protection element is accommodated is provided between the two sections. This holding section is preferably configured in such a way that it is situated between the structural element and the fire-protection element. In this manner, the fire-protection element is reliably protected against the liquid construction material when the wall or the floor/ceiling is being built. Together with the housing sections, the holding section can form a stable wall which prevents the fire-protection element from being compressed by the pressure exerted by the flowable material. In particular, this holding section is made of metal, thus allowing a quick transmission of heat from the structural element to the fire-protection element, so that the latter can be activated more quickly and can expand in case of fire.

The housing widens perpendicular to the lengthwise direction, for example, in the area of the holding section, so that an encircling groove is formed in the circumferential direction, and the fire-protection element is arranged in this groove. The fire-protection element can be arranged in this holding section in such a way that it does not project beyond the two sections, as seen in the lengthwise direction of the housing. Therefore, the fire-protection element cannot be damaged when a line is inserted into it.

The housing is configured, for example, so as to be cylindrical, thus forming an ideal conduit for a pipe or a round line. Moreover, the pressure resistance of a cylinder to the liquid concrete or to another construction material is excellent, thus reliably ruling out any compression of the line conduit when the structural element is being cast.

A flange that projects radially can be provided on the first and/or second section of the housing and can be employed in a formwork used for the structural element, for example, to fasten or seal off the line conduit. Moreover, this flange constitutes a more stable connection between the structural element and the line conduit. The flange can rest on the surface of the finished structural element or else it can be flush with it. If applicable, the flange and thus the line conduit can be anchored in the structural element by means of additional fastening elements or else they can be attached to these additional elements.

A flange only allows the attachment or sealing off of the line conduit on a flat substrate on which the flange can rest so as to cover the entire surface. For purposes of attaching the line conduit to differing substrates, other fastening devices can also be provided on the first and/or second section.

The line conduit is normally placed onto the formwork in such a way that it seals tightly against the formwork and no flowable construction material can penetrate into the holding space. The housing can also have closure elements with which the holding space is closed in the lengthwise direction so that there is additional protection against penetration by the construction material into the holding space when the structural element is being built. These closure elements can be removed, for example, together with the formwork, after the structural element has been built, so that the holding space is freely accessible.

The anchoring element can be made, for instance, of metal, thus allowing a quick transmission of heat to the fire-protection element. However, it is likewise possible for the anchoring element to be at least partially made of plastic, which facilitates the shaping of the anchoring element.

BRIEF DESCRIPTION OF THE DRAWINGS

Additional advantages and features can be found in the description below in conjunction with the accompanying drawings. These show the following.

DETAILED DESCRIPTION

Figure 1:
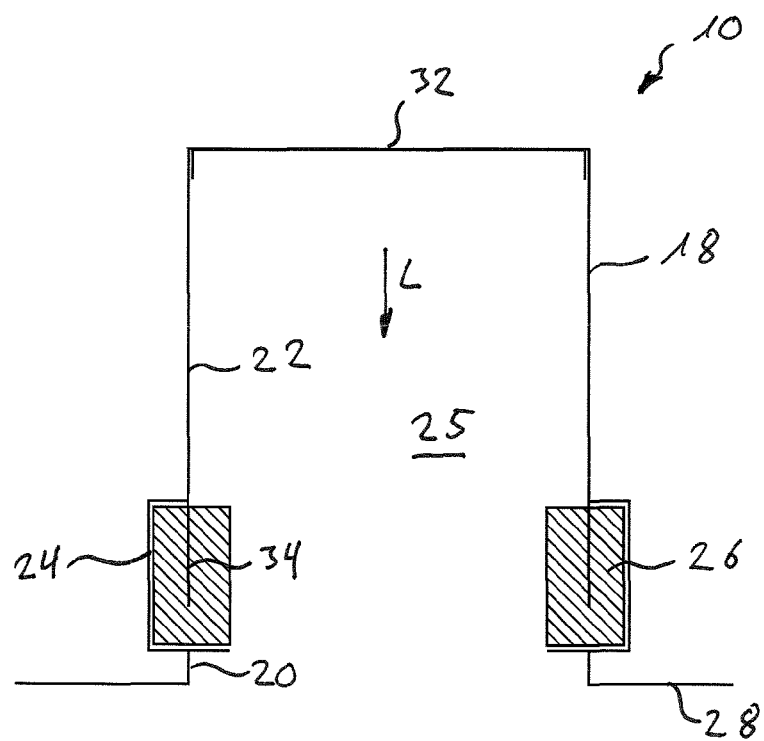
FIG. 1 a line conduit according to the invention.
Figure 4:
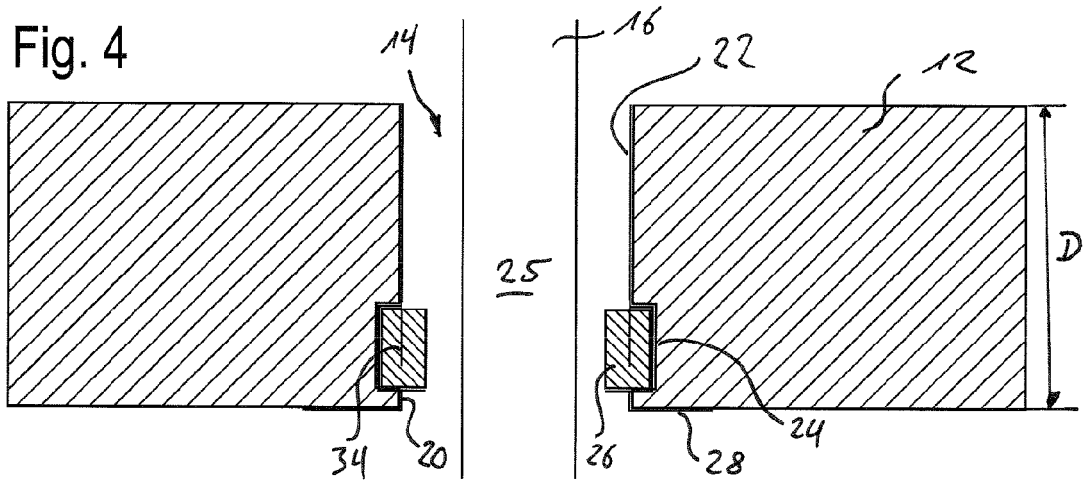
FIG. 4 a structural element with the line conduit as shown in FIG. 1.
Figure 5:
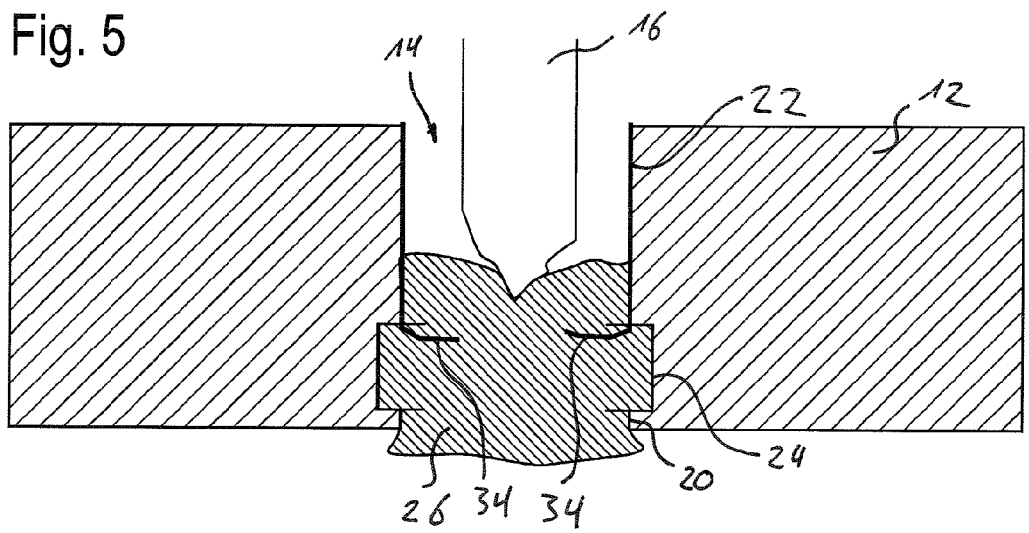
FIG. 5 the structural element from FIG. 4 after a fire test has been carried out.

FIG. 1 shows a line conduit 10 for a structural element 12 (see FIGS. 4 and 5). During or after the building of the structural element 12, which is cast using a liquid construction material, for example, concrete, the line conduit 10 serves to keep a passage 14 free through which a line 16, for instance, a cable or a pipe, can pass. Another function of the line conduit 10 is to seal the passage 14 in order to prevent penetration by smoke or flames through the passage 14 in case of a fire.

The line conduit 10 comprises a housing 18 having an essentially cylindrical shape. The housing 18 has a first section 20 as well as a second section 22, whereby the cross section of both sections 20, 22 is essentially the same. A holding section 24 is provided between the sections 20, 22 and it forms a groove-like, circumferential widened portion of the housing 18 between the sections 20, 22. Together with the holding section 24, the sections 20, 22 define a holding space 25 for the line 16.

The holding section 24 has an essentially U-shaped cross section in which a fire-protection element 26 made of an intumescent material is accommodated. Upon exposure to heat, the protection element 26 increases in terms of its volume so that the passage 14 in the structural element 12 or the holding space 25 is sealed and the propagation of smoke or flames is prevented. The sections 20, 22 are each in contact with a leg of this U so that the holding section 24 forms a groove or depression in the holding space 25 that is oriented radially outwards.

Figure 3:
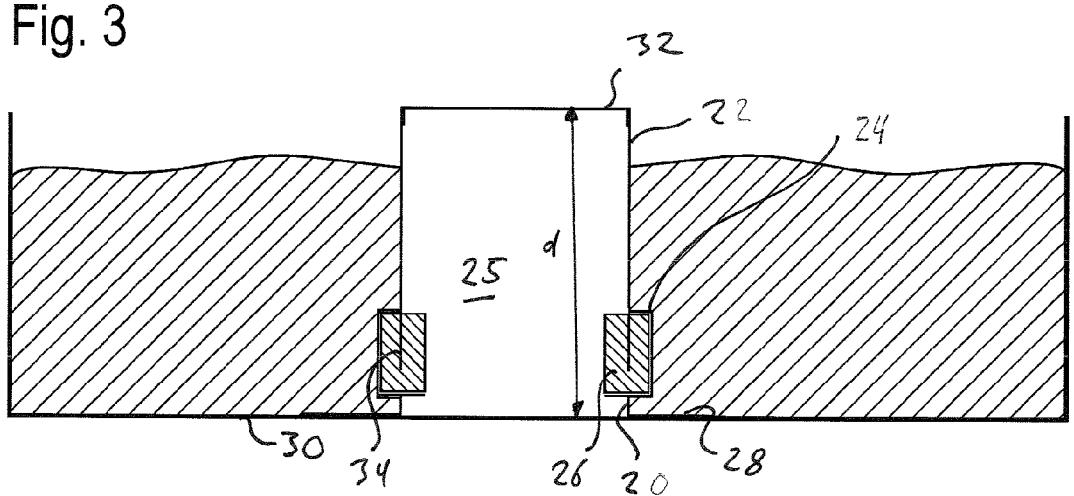
FIG. 3 a mold for building the structural element with the line conduit as shown in FIG. 1.

On the first section 20, there is a radially projecting flange 28 that serves to attach and seal the line conduit 10 to a mold 30, for example, formwork for concrete, into which the structural element 12 can be cast (also see FIG. 3). Moreover, this flange 28 accounts for better fixation of the line conduit 10 in the finished structural element 12.

The second section 22 has a closure element 32 that can be removed after the structural element 12 has been made. The closure element 32 closes off the holding space 25 and protects it against the liquid construction material that could flow into the holding space 25 when the structural element 12 is being built.

Moreover, on the second section 22, there is an anchoring element 34 that extends in the lengthwise direction L of the housing 18 into the holding section 24 and thus into the fire-protection element 26, or else the anchoring element 34 is anchored in the fire-protection element 26. In the embodiment shown here, the anchoring element 34 is formed by a part or an extension of the second section 22 that extends all the way into the fire-protection element 26. However, it is possible for the anchoring element 34 to be a separate component that is provided on one of the sections 20, 22 or on the holding section 24.

Figure 2:
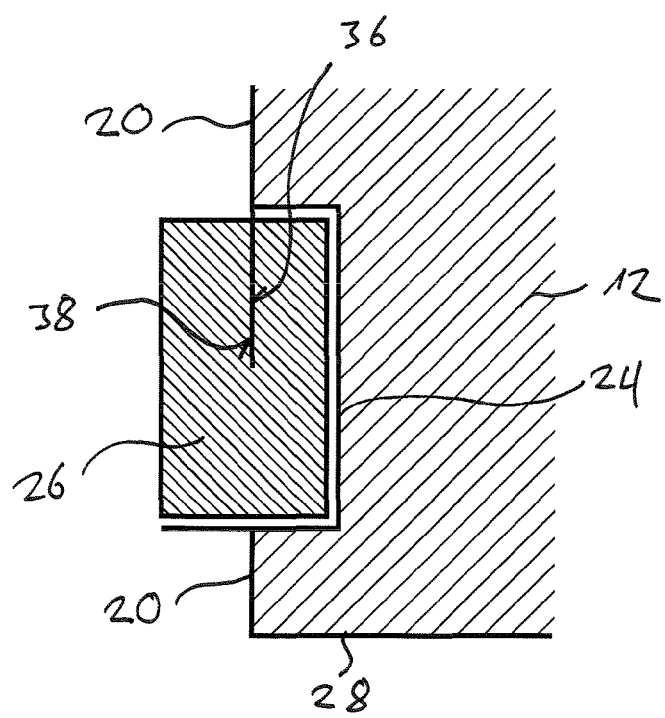
FIG. 2 a detailed view of the fire-protection element of the line conduit as shown in FIG. 1.

As can be seen in FIG. 2, the anchoring element 34 is covered by the fire-protection element 26, in other words, by the intumescent material, on the radial outside 36 as well as on the radial inside 38.

Before the structural element 12 is made, the line conduit 10 is positioned in a mold 30 (FIG. 3) and affixed in it. The length d of the line conduit 10 is selected in such a way that it is equal to or greater than the thickness D of the structural element 12, so that the passage 14 can be kept completely free.

Subsequently, the liquid construction material, for instance, concrete, is poured into the mold 30. After the construction material has hardened, the mold 30 is removed, whereby the positioning elements that had been provided on the mold 30 or on the line conduit in order to affix the position in the mold can also be removed during this step. Subsequently, the closure element 32 can be removed and a line 16 can be laid through the line conduit 10 (FIG. 4).

If the structural element 12 is exposed to strong heat, for example, because of a fire, this causes the line 16 to melt in this area, so that a constriction is formed owing to the intrinsic weight of the line 16. At the same time, the generation of strong heat activates the fire-protection element 26, which then expands so that the passage 14 is closed off by the fire-protection element 26 (FIG. 5). In this process, the remaining soft line 16 is compressed by the fire-protection element 26, thereby completely sealing off the passage 14.

As can be seen in FIG. 5, the intumescent material causes the anchoring element 34 to be bent on the radial outside 36 radially inwards into the passage 14, so that the anchoring element 34 projects radially inwards from the inner wall of the housing 18 after the fire-protection element 26 has swelled up.

In this position, the fire-protection element 26 is securely held by the anchoring element 34 and cannot be moved out of the holding space 25 of the line conduit 10 or out of the passage 14. As a result, the line conduit 10 or the fire-protection element 26 can reliably seal off the passage 14, even under strong forces, for instance, due to the impact of a jet of water.

The prior-art fire-protection elements 26 were only able to withstand such forces if the intumescent compound of the fire-protection element 26 was dimensioned so as to be correspondingly larger. Thanks to the line conduit 10 according to the invention, the fire-protection element 26 can be configured so as to be considerably smaller and more compact since the anchoring element 34 accounts for a much better fixation of the fire-protection element 26 in the passage 14.

In order to attain better heat conduction into the fire-protection element 26 and thus a faster activation of the fire-protection element 26, the holding section 24 is preferably made of a metal having high thermal conductivity. The rest of the housing 18 as well as the anchoring element 34 can be partially made of metal or plastic.

The anchoring element 34 preferably has interruptions in the circumferential direction so that it can be easily bent radially inwards. It is also conceivable to provide several anchoring elements 34 that are distributed in the circumferential direction. They do not have to extend in the lengthwise direction L into the fire-protection element 26. All that has to be ensured is that the anchoring elements 34 remain inside the fire-protection element 26 after the latter has swelled up so as to ensure that the fire-protection element 26 is held in the passage 14.

The fire-protection element 26 likewise does not have to project outwards in the radial direction beyond the first or second section 20, 22. Therefore, the inner wall of the housing 18 can also have a constant diameter throughout, so that during assembly, a line 16 cannot get caught on a protruding fire-protection element 26.

The sections 20, 22 can also be configured differently, whereby the position of the fire-protection element 26 can be varied by means of the length of the sections 20, 22.

In particular, it is also conceivable to have a configuration with only one section 20, 22.

A section 20 on which there is no anchoring element 34 can also be configured in such a way that it can be removed after the structural element 12 has been made.

The holding space 25 can also be closed off vis-à-vis the mold 30 by means of a second closure element that can be provided on the first section 20.

What is claimed is:

1. A line conduit to be cast into a structural element made of concrete, comprising:
   an elongated housing to be cast into the structural element for contact with the structural element and having a holding space for at least one line passing through the elongated housing, said holding space being continuous in the lengthwise direction, the housing having an inner wall;
   a fire-protection element made of an intumescent material and arranged around the inner wall of the housing in the circumferential direction; and
   at least one anchoring element provided on the inner wall of the housing, said element being anchored inside the fire-protection element.

2. The line conduit as recited in claim 1 wherein the at least one anchoring element is arranged, at least in certain sections, in the lengthwise direction of the housing.

3. The line conduit as recited in claim 1 wherein the housing has two sections with an essentially constant cross section, the fire-protection element being arranged between the two sections.

4. The line conduit as recited in claim 3 wherein the anchoring element projects from a first or second section of the two sections in the lengthwise direction and extends into the fire-protection element.

5. The line conduit as recited in claim 4 wherein the anchoring element is part of the first or second section and extends into the fire-protection element.

6. The line conduit as recited in claim 3 wherein between the two sections, the housing has a holding section, the fire-protection element being accommodated in the holding section.

7. The line conduit as recited in claim 6 wherein the holding section is made of metal.

8. The line conduit as recited in claim 6 wherein in the area of the holding section, the housing widens perpendicular to the lengthwise direction.

9. The line conduit as recited in claim 8 wherein the housing is configured so as to be cylindrical, at least in certain sections.

10. The line conduit as recited in claim 4 further comprising a flange projecting radially on the first or second section.

11. The line conduit as recited in claim 3 further comprising fastening devices on a first or second section of the two sections for installation in formwork or in a structural element.

12. The line conduit as recited in claim 1 further comprising closure elements on the housing for purposes of closing the holding space in the lengthwise direction.

13. A line conduit as recited in claim 1 wherein the anchoring element is at least partially made of plastic.

14. A method for installing the line conduit as recited in claim 1 comprising casting the line conduit into the structural element.

15. The line conduit as recited in claim 1 wherein the elongated housing is cylindrical.

16. The line conduit as recited in claim 1 wherein the elongated housing has a first cylindrical section and a second cylindrical section having similar cross sections, the first and second cylindrical sections being axially spaced from each other.

17. The line conduit as recited in claim 1 wherein the elongated housing has a circumferentially widened holding section between the first and second cylindrical sections.

* * * * *